UNITED STATES PATENT OFFICE.

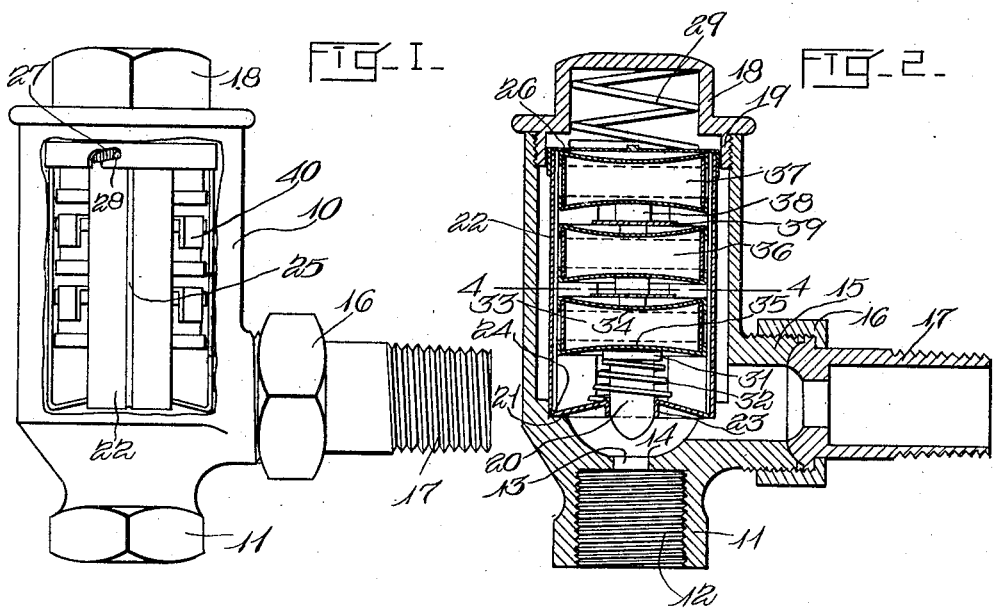

GEORGE D. HOFFMAN, OF PASADENA, CALIFORNIA, ASSIGNOR TO HOFFMAN SPECIALTY COMPANY, OF CHICAGO, ILLINOIS, A CORPORATION OF ILLINOIS.

STEAM-TRAP FOR RADIATORS.

1,351,037. Specification of Letters Patent. Patented Aug. 31, 1920.

Application filed June 28, 1915. Serial No. 36,859.

*To all whom it may concern:*

Be it known that I, GEORGE D. HOFFMAN, a citizen of the United States, and resident of Pasadena, in the county of Los Angeles and State of California, have invented certain new and useful Improvements in Steam-Traps for Radiators, of which the following is a specification.

The present invention relates to devices in the nature of steam traps, and particularly to such traps as are used on the return lines of steam radiators to permit return to the boiler of the water of condensation only. More particularly the invention is a thermostatic steam trap which is closed when the temperature to which it is exposed becomes of a given degree, and is opened when the temperature falls to a lower degree. My object has been to produce a trap operating on the principle indicated of which the valve shall have a wide range of movement and be operable throughout its extreme movement by comparatively small temperature changes, and at the same time produce a trap which shall be compact and with neither its entire volume nor any dimension so great as to make the trap awkward to use or ungainly in appearance, or requiring an inconveniently large amount of space for installation.

I have shown what I consider at the present time to be the preferred form or embodiment of the trap in the accompanying drawings in which—

Figure 1 is a side elevation of the trap with the outer casing partly broken away.

Fig. 2 is a central section of the trap.

Fig. 3 is a view showing the casing of the trap in central section and the expansible drums in elevation, the valve being shown closed.

Fig. 4 is a cross section of the internal parts of the trap taken on line 4—4 of Fig. 2.

The same reference characters indicate the same parts in all the figures.

In the drawings 10 represents a casing having a socket 11 on one end which socket is internally threaded, as shown at 12 in Figs. 2 and 3, and communicates through a passage 13, the lip 14 of which forms a valve seat, with the interior of the casing. An externally threaded nipple 15 branches from the side of the casing and opens into the interior of the latter. Said nipple supports in threaded connection a nut 16 which couples a connection 17 to the nipple in a well known manner, clearly shown in Figs. 2 and 3. The coupling 17 and nipple 15 have a ball and socket joint, as shown.

In the following description I will consider the trap as being placed in the position indicated in the drawings, that is, with the casing vertical, this assumption being made for the purpose of convenience of description and not with limiting intent.

The upper end of the casing is open and is fitted with a cap 18 which has a flange 19 threaded into the open end of the casing.

The valve 20 which coöperates with the valve seat 14 is carried by a cage which is set into the casing and rests on a shoulder 21 somewhat above the valve seat, such shoulder being annular and located slightly within the walls of the casing. The cage is a structure made of three, more or less, outer members 22 extending in parallel and spaced about an intermediate point. Transverse members extend from the lower ends of these outer or longitudinal members toward the central point, where they are joined together and provide a guide sleeve or socket 23 for the valve. The angles or corners at which the longitudinal members join the transverse members, form the stops or seats 24 by which the cage is supported on the shoulder 21. Conveniently the cage is made out of a drawn metal shell, the sides and bottom of which are cut out in the manner illustrated in the drawings so as to leave the longitudinal and transverse members above described, and a ring at the top edge which joins the upper ends of the longitudinal members and strengthens the cage at this part. The aperture for the valve is pierced through the bottom of the shell and the flange 23 which forms the guide sleeve is turned up from the material of such bottom around the aperture. Other modes of manufacture may, however, be employed. The result is the formation of a cage of a size adapting it to be slipped freely into and out of the casing and of sufficiently open construction to admit the steam to all parts of the interior thereof in which are located the thermostatic motors hereinafter described. Preferably also the longitudinal members are stiffened by offsetting the same in the longitudinal middle part thereof, forming grooves 25 and complemental ribs, as shown in Figs. 1 and 4. The upper end of the cage is closed by a cover 26, which has a flange embracing the upper end of the cage and provided with offset slots 27 which engage pins 28 on the cage, making a bayonet joint lock. The flange of the cover 26 is enough smaller than the flange 19 of the cap 18 to lie within such flange, whereby the cage is held upright and centrally in the casing. A spring 29 is contained within the offset center of the cap 18 and presses against the cover 26 of the cage, holding the cage against the abutment 21.

The valve 20 has a head or projecting rim 31 which overlies the end of a spiral spring 32 surrounding the stem of the valve and reacting against the bottom of the cage. The spring tends constantly to raise, that is, to unseat, the valve. Resting upon the end of the valve is a drum or box 33 which lies in the cage and is freely movable up and down therein. The top and bottom walls 34, 35 of the box or drum are flexible diaphragms, preferably of metal, which have a certain amount of fullness and are centrally offset. The drum is filled with a volatile liquid or filled partly by the liquid and partly by the vapor of the liquid. This liquid may be any one of a number of well known substances which vaporize at approximately the temperature of the steam and condense at a slightly lower temperature. The temperature at which this liquid will vaporize and condense is not of moment to this invention, since it is open to the art to select from a wide range of substances those which will act at any temperatures within the range of the desired operation of the trap.

It is not necessary, however, to use a volatile liquid, since I may operate the trap by expansion and without vaporization of the liquid, although for my purpose vaporization is preferred on account of the more rapid action and the greater range of action. I will call the box or drum 33 a thermostatic motor, since its function is to produce motion as a consequence of differences in temperature.

Above the thermostatic motor 33 is a second thermostatic motor 36, and above that a third motor 37 of the same character. The three thermostatic motors here shown are illustrated as being alike and I prefer that they should be so, each having the dished flexible heads and being filled or partly filled with a volatile liquid. All of the drums or motors are loosely contained in the cage and are supported by the valve 20. Spacers are contained between the drums to transmit the pressure of each to the next at a central point. The spacers between each two drums are alike and comprise a stud 38 and a spider 39. The stud passes through and is secured in a hole in the spider and the latter has a sufficient number of arms, turned down so as to embrace the edges of the drum underneath, to hold the stud in a central position. The spider is shown in plan view in Fig. 4, in section in Fig. 2 and in elevation in Figs. 1 and 3. The last two figures show the turned down ends 40 of the arms of the spiders. It will be appreciated that when any one of the thermostatic motors is expanded, the motion of its diaphragms is transmitted to the next motor by the adjacent spacer.

The operation of the trap is as follows: Let it be assumed that the coupling 17 is connected with a steam radiator and the nipple 11 with the return pipe to the boiler, and also that the valve is opened as shown in Fig. 2, the several thermostatic motors being contracted by low temperature and the spring 32 supporting the weight of the valve and of all the superposed motors and spacers. In this condition condensed water in the radiator is free to pass through the trap to the return line. When steam, or water nearly as hot as steam, passes through the trap the motors are expanded and the valve 20 is closed against the seat 14. Preferably all of the motors operate as nearly at the same temperature as possible, whereby the valve is suddenly closed; and after the water contained in the trap has had time to cool somewhat, it is suddenly again opened.

The advantage of having several motor drums arranged to act in series on the valve is that the movement produced by the several drums is added together in being applied to the valve, whereby a movement as many times greater than can be given by one drum, as there are drums, is imparted to the valve. At the same time the desired range of such movement is produced without making the drum of excessively large diameter, thereby keeping the trap compact and allowing it to be installed in spaces and locations where it is comparatively inconspicuous.

The entire cage carrying the valve and the series of motors is readily removable from the casing as a single unit and the several motors and other parts as readily removable from the cage. The abutment against which the motors act in closing the valve is the spring 29, which is adapted to yield in case the fluid in the motor drums should continue to expand after seating of the valve. I do not claim herein the combination of a cage or holder with a valve and a thermostatic motor therefor constructed as a unit placeable and removable as such in and from the casing, nor the combination of such a unit with a yielding spring adapted to relieve the pressure of the valve when the thermostatic motor continues to expand after seating of the drum, for my claim to such subject matter is made in a companion application filed September 2, 1916, Serial Number 118,300, entitled Thermo valve, which discloses these combinations. My claim to all subject matter common to the two applications is made in the said companion application, and I claim herein only the features which differentiate the present from the companion application.

Nothing in the foregoing description shall be understood as limiting the invention to any particular use or to any particular dimensions or proportions. I reserve the right to apply the principles of the invention to all types and sizes of steam traps in all uses for which said traps are adapted.

What I claim and desire to secure by Letters Patent is:

1. A steam trap comprising a casing provided with a valve seat at one end, and an abutment contiguous thereto, a cap removably engaging the other end of the casing, a cage removably supported within said casing independently of the valve seat and of the cap, a thermostatic motor inclosed within said cage, a valve coöperating with said seat, said valve being movable independently of the motor and guided by the cage, a spring acting to move the valve away from its seat, said cage, motor, valve, and spring constituting a single unitary structure, said motor acting to move the valve to its seat, and a spring interposed between the cap and the cage to hold the latter yieldably in operative position.

2. A steam trap comprising a casing provided with a valve seat, a cage located within said casing, a valve extending through and guided by one end of said cage, a spring acting to unseat said valve, a plurality of superposed thermostatic chambers resting upon said valve, and spacers separating said chambers, each spacer comprising a spider to embrace the next adjacent chamber and provided with a central stud for supporting the chamber above it.

3. A thermostatic motor comprising a casing having a valve seat, a valve movable toward and away from said valve seat, a cage or guide supported in said casing holding said valve with capability for movement toward and away from said valve seat, a spring acting on said valve and reacting on the cage or guide tending to withdraw the valve from the seat, an expansible thermostatic motor acting on said valve and reacting against said cage or guide, and a spring pressing said cage or guide toward the valve seat and adapted to yield.

4. As an improvement in steam traps, a thermostatic valve unit comprising a sheet metal cage of skeleton form having spaced apart side walls, and provided at one end with a guide sleeve, a cap removably attached to the other end, a valve extended through and guided by said sleeve, and one or more closed disconnected and independent thermostatic chambers removably retained within said cage by said cap and coöperating with said valve.

5. In a steam trap the combination with a casing of a thermostatic unit comprising a cage having a guide sleeve in one end, a valve slidingly mounted in said sleeve, a plurality of expansible thermostatic drums, arranged in substantially axial alinement in said cage and being guided by the sides of the latter, the drum at one end of the series being arranged to press on the valve, and the cage having an abutment against which the drum at the other end of the series bears, and disconnected spacers between the drums for transmitting pressure from one to the next.

6. As an improvement in steam traps, a thermostatic valve unit comprising a cage having longitudinal side members, a central guide at one end, and a cover at the other end, a valve passing through said guide and movable endwise therethrough, a series of expansible drums each hermetically closed and containing a volatile fluid, said drums arranged in substantially axial alinement and loosely fitted between the longitudinal members of said cage, the drum at one end being arranged to press on the valve, and that on the other end to press against said cover, and disconnected spacers between the drums for transmitting pressure from one to the other.

In testimony whereof I have affixed my signature.

GEORGE D. HOFFMAN.

Witnesses:
  M. G. KIBBE,
  FRANK CORCORAN.